US007080731B2

(12) United States Patent
O'Brien et al.

(10) Patent No.: US 7,080,731 B2
(45) Date of Patent: Jul. 25, 2006

(54) DISC PACKAGE

(75) Inventors: Patrick O'Brien, York, ME (US); H. Anthony DiRico, Milton, MA (US)

(73) Assignee: Hub Folding Box Company, Inc., Mansfield, MA (US)

( * ) Notice: Subject to any disclaimer, the term of this patent is extended or adjusted under 35 U.S.C. 154(b) by 0 days.

(21) Appl. No.: 10/755,978

(22) Filed: Jan. 13, 2004

(65) Prior Publication Data

US 2005/0150790 A1  Jul. 14, 2005

(51) Int. Cl.
*B65D 85/57* (2006.01)
(52) U.S. Cl. .................................. 206/308.1; 206/1.5
(58) Field of Classification Search ............. 206/308.1, 206/309, 310, 311, 312, 313, 493, 460, 1.5
See application file for complete search history.

(56) References Cited

U.S. PATENT DOCUMENTS 4,709,812 A   12/1987  Kosterka
5,205,405 A   4/1993   O'Brien et al.
5,219,074 A   6/1993   Mizuno et al.
5,219,417 A   6/1993   O'Brien et al.
5,332,089 A   7/1994   Tillett et al.
5,366,074 A   11/1994  O'Brien et al.
5,788,068 A   8/1998   Fraser et al.
5,884,761 A * 3/1999   Gelardi et al. ........... 206/308.1
6,092,650 A * 7/2000   Budnik ....................... 206/232
6,125,102 A * 9/2000   Tricart ........................ 720/734
6,283,283 B1* 9/2001  Rufo et al. ............... 206/308.1
6,626,291 B1* 9/2003  Pozzoli ..................... 206/308.1
D494,001 S  * 8/2004  Wynalda et al. ............. D6/634

* cited by examiner

Primary Examiner—Shian T. Luong
(74) Attorney, Agent, or Firm—Fish & Richardson P.C.

(57) ABSTRACT

Packaging for an object such as a digital recording medium that is contained within a plastic molded tray that is mounted on a panel. The tray is molded with extensions from opposite edges of one surface of the tray. Each extension folds to form a peripheral wall along that edge and it engages an element of the tray to permanently lock the extension in place. In their locked positions, the extensions fold around opposite edges of the panel so that the panel is locked in place under the tray.

12 Claims, 3 Drawing Sheets

DISC PACKAGE

TECHNICAL FIELD

This invention relates to packaging for flat or planar objects, flat discs used as recording media such as CD and DVD discs.

BACKGROUND

CD and DVD discs are typically sold in packaging that includes graphics and product inserts, as well as the actual recording media. The packaging should include a reliable disc holder permitting the user to remove and reinsert the disc. Such disc holders typically are made from molded plastic. One such device is a molded plastic tray with a releasable hub catch that easily and reliably engages and disengages the central hole in the medium. The tray is attached to folded packaging, usually made of paperboard, that is printed with various information about the product.

In some cases, the plastic tray is glued to the paperboard, e.g., using a hot-melt adhesive. One such tray is disclosed in U.S. Pat. No. 4,709,812. A clear plastic tray (i.e., one that allows the user to view images on the printed paperboard underneath the tray) is not usually advisable in this type of construction, because the adhesive will be aesthetically unacceptable.

U.S. Pat. Nos. 5,366,074 and 5,219,074 disclose a storage package that includes a plastic disc holder secured to a non-plastic panel. Rather than use adhesives, the main portion of the plastic holder is connected to the plastic extensions by living hinges that can pivot to releasably secured the disc holder to the paperboard panels as described at col. 9, lines 29 et seq. The hinge allows the extensions to pivot and releasably engage the paperboard panel. For example, lugs on the extension protrude through openings in the panel to engage recesses on another portion of the plastic holder on the opposite side of the panel. The plastic disc holder is easily removed by pulling the lugs from the recesses, pivoting the extensions and releasing the panel. Thus, the ultimate consumer can remove the disc holder (which is recyclable) from the paperboard panel (which can also be recycled) to improve the end-user's opportunity to recycle the product packaging. To allow the extensions to be opened and closed several times (for attachment to and disassembly from the printed blank) polypropylene is used to produce the tray with living hinges connecting the extensions other tray. One drawback of polypropylene is its lack of clarity when molded.

SUMMARY

This invention features an essentially clear plastic disc tray that mechanically attaches to a printed blank, creating a containment package. By essentially clear, we mean substantially without esthetically undesirable sacrifice in clarity, particularly the sacrifice in clarity typically present with polypropylene packaging. Since no adhesive is required to attach the tray to the blank, graphics beneath the tray are effectively unobstructed. The mechanical attachment is achieved by molding the tray with extensions from opposite edges of one surface of the tray. Each extension is connected to the main body of the tray by notched fold lines. The tray is attached to the paperboard panels by folding the extensions along the fold lines, so that the extensions are severed from the main tray body along the fold lines. The extensions lock into an element of the tray to permanently lock the extension in place. In their locked positions, the extensions connect opposite edges of the panel so that the panel is locked in place under the tray the locking feature is permanent in that disengaging the extensions from the main body of the tray requires significant force, risking breakage of the plastic package components.

In one particular embodiment, the tray includes a permanent peripheral wall around at least one of the opposite edges of the panel, and at least one of the extensions engages and locks into that peripheral wall. Typically each of the opposite edges has such a peripheral wall, and each of the extensions locks to one of the opposite edges of the panel. The extensions may include a lip that engages the edge of the panel holding it in place. The locking mechanism may be a tab that mates with a locking feature (e.g., a with mating recess or hole) on the peripheral wall to engage the extension and hold it at the edge of the peripheral wall.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
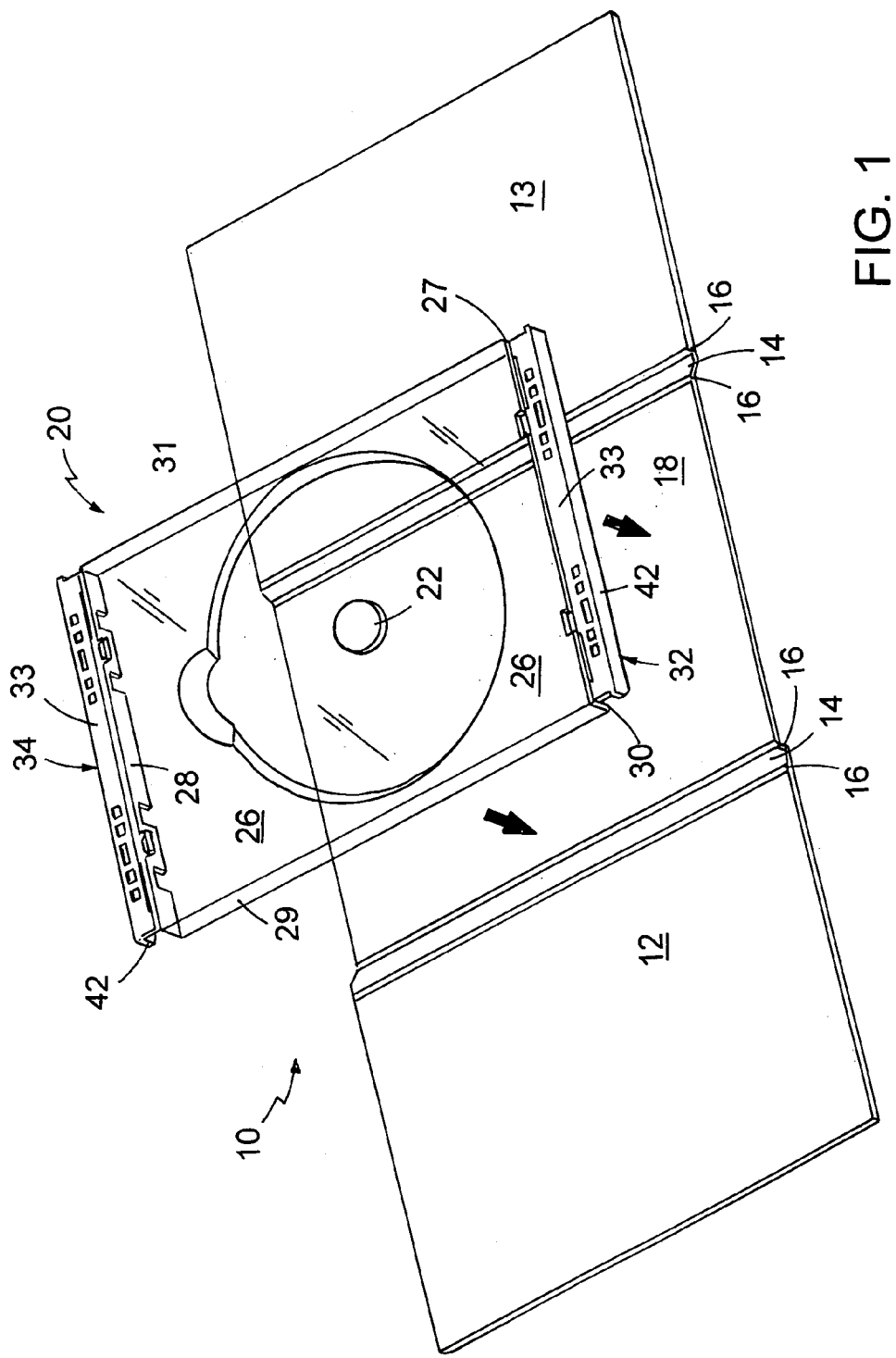
FIG. 1 is a top view of a disc holder before it attached to paperboard panels, with the panels shown separately.
Figure 2A:
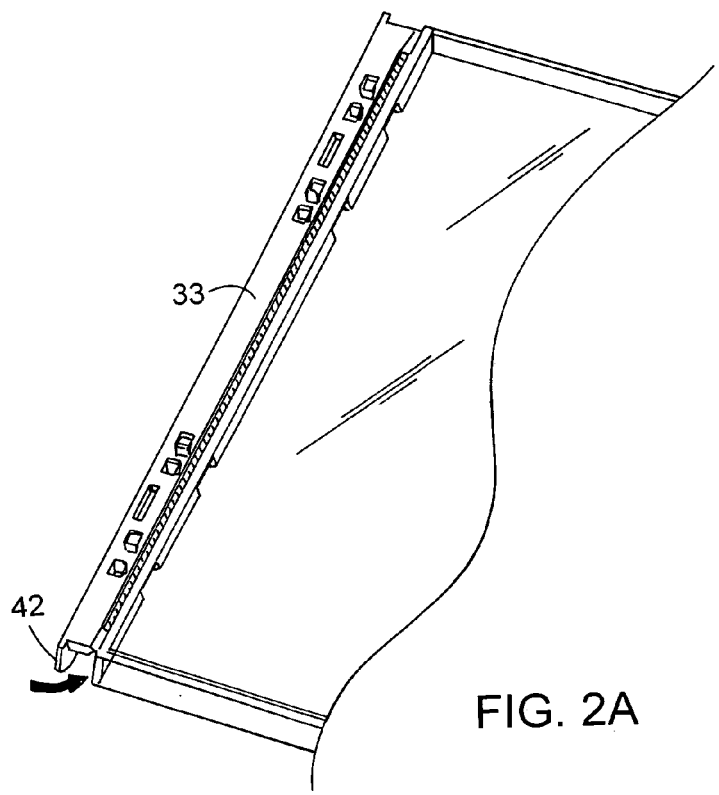
FIG. 2A and FIG. 2B are views of the disc holder of FIG. 1, showing pivoting extensions and a breakable connection between the extensions and the main body of the disc holder.
Figure 2B:
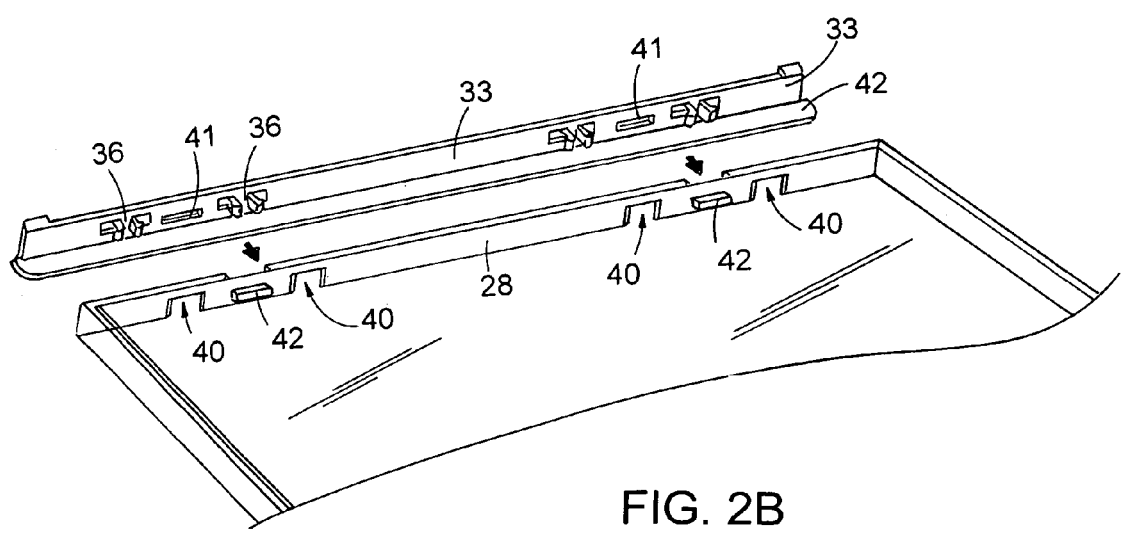
Figure 3:
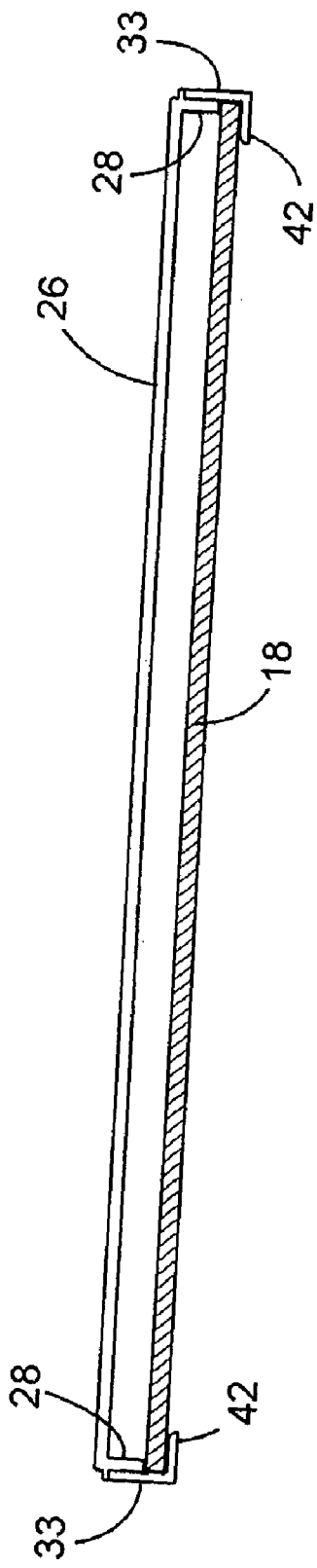
FIG. 3 is a cross section of a disc holder/panel assembly.

In FIG. 1 shows a standard three-panel paperboard CD/DVD container 10 and a plastic disc holder 20. Container 10 and disc holder 20 are assembled to produce CD/DVD packaging.

Container 10 includes three side-by-side panels 12, 13 and 18 connected by two strips 14. Strips 14 permit the panels to be folded over one another along pre-scored fold lines 16. Those skilled in the art will generally be familiar with such panels and no further description is required here. For example, external surfaces of the container panels may be printed with any desirable design or printed information. Panel 18 is designed for attachment to disc holder 20 as described below.

Disc holder 20 is made as a single piece of injection molded plastic, such as crystal styrene or other plastic material selected for clarity. Disc holder 20 includes a hub 22 to attach the recording medium disc to the disc holder. Any of a number of suitable designs may be used for hub 22. Disc holder 20 is shown as it exists after molding but before assembly to panel 18. In that form, holder 20 includes a disc-holding face 26 and peripheral walls 28, 29, 30 and 31, extending around the perimeter of face 24. The peripheral walls 28 serve to support the perimeter of face 26.

As molded, disc holder 20 also includes extensions 32 and 34 extending respectively from top and bottom of holder 20. Extensions 32 and 34 are identical and can be described with reference to features on either one of them. Wall 33 is connected to face 26 by a scored region 27. Extension 32 includes four pairs of locking prongs (each referenced as 36) spaced along the length of wall 33. Prongs 36 face downward prior to assembly of holder 20 to container 10. A rectangular hole 41 is positioned between the first and second pair of prongs 36, and a second hole 41 is positioned between the other two pairs of prongs. Finally, extension 32 includes a lip 42 extending generally perpendicular to wall 33.

Peripheral walls 28 and 30 include slots 40 to receive each of the prong pairs 36, and they include lugs 42 that fit within the holes 41 on walls 33.

To assemble holder 20 to panel 18, the holder is positioned over panel 18 and extensions 32 and 34 are bent downward, severing the connection to face 26 at scored region 27. At the same time, the prong pairs 36 are snapped into slots 40 and the lugs 42 are forced into holes 41, locking the extension 34 to peripheral wall 28. Panel 18 is crimped between lip 42 and the bottom of wall 28. Extension 32 is locked into place against wall 30 in a similar manner, thus locking holder 20 in place on top of panel 18.

A number of embodiments of the invention have been described. Nevertheless, it will be understood that various modifications may be made without departing from the spirit and scope of the invention. Accordingly, other embodiments are within the scope of the following claims.

What is claimed is:

1. Packaging to contain a flat disc on a panel, the packaging comprising,
    a plastic, molded, disc retaining tray, the tray being mounted on the panel, the tray comprising,
    (a) a disc retainer to retain the disc on a surface of the tray, and
    (b) at least one extension from an edge of the tray surface, the extension being attached to the tray surface by a severable connection which breaks when the extension is folded from an initial position in which the extension extends generally away from the tray surface to a locking position in which the extension: i) extends transverse to the tray surface; ii) envelopes an edge of the panel to engage the tray in place over the panel and iii) comprises a first lock element that engages a second, co-operating lock element attached to the tray surface, to lock the extension in place in the locking position.

2. The packaging of claim 1 in which the tray comprises a peripheral wall extending transverse to the tray surface, said peripheral wall comprising said second lock element.

3. The packaging of claim 1 in which said extension is one member of a pair of extensions, the members of the pair extending from opposite edges of the tray surface, each member of said pair of said extensions comprising a said first lock element, and each member of said pair being attached to the surface by a severable connection which breaks when the extension is folded from an initial position generally in which the extension extends generally away from the tray surface to a locking position in which the extension: i) extends transverse to the tray surface; ii) envelopes an edge of the panel to engage the tray in place over the panel and iii) comprises a first lock element that engages a second, co-operating lock element attached to the tray surface, to lock the extension in place in the locking position.

4. The packaging of claim 1 in which the tray comprises at least two peripheral walls, each peripheral wall extending transverse to the tray surface adjacent opposite edges of the panel, each of said peripheral walls comprising one of said tray lock elements, the tray further comprising at least one pair of said at least one extension, the members of the pair extending from opposite edges of the tray surface, each of said extensions being attached to the surface by a severable connection which breaks when the extension is folded from an initial position generally in which the extension extends generally away from the tray surface to a locking position in which the extension: i) extends transverse to the tray surface; ii) envelopes an edge of the panel to engage the tray in place over the panel and iii) comprises a first lock element that engages a second, co-operating lock element attached to the tray surface, to lock the extension in place in the locking position.

5. The packaging of claim 3 or claim 4 in which at least one member of said pair of extensions includes a lip that engages an edge of the panel holding it in place.

6. The packaging of claim 1 in which one of said locking elements comprises a lug that mates with the other of said locking elements, the other of said locking elements comprising a recess to receive said lug.

7. The packaging of claim 6 in which the lug is said second locking element attached to said tray surface.

8. The packaging of claim 1 in which one of said locking elements comprises a spring clip that resiliently mates with the other of said locking elements, the other of said locking elements being a recess sized to receive said spring clip.

9. The packaging of claim 6 in which said spring clip comprises a pair of resilient prongs.

10. The packaging of claim 1 in which said tray comprises a plastic material that is substantially clear.

11. The packaging of claim 1 or claim 9 in which said tray is crystal styrene polymer.

12. A method of assembling the packaging of claim 1 comprising assembling said tray to said panel by
    (a) positioning said tray over said panel; and
    (b) moving said extension from said initial position to said locking position.

* * * * *